United States Patent Office 2,973,385
Patented Feb. 28, 1961

2,973,385
DIALKYLAMINOALKYL CHLOROCARBANILATES AND PROCESS

Kurt J. Rorig, Glenview, Ill., assignor to G. D. Searle & Co., Chicago, Ill., a corporation of Delaware No Drawing. Filed Mar. 10, 1958, Ser. No. 720,018

12 Claims. (Cl. 260—472)

This invention relates to aminoalkyl esters of halogenated carbanilic acids, the salts of such esters, and processes for the manufacture of these esters and their salts. More particularly, this invention relates to compounds of the formula

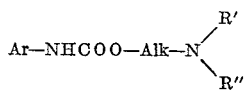

wherein Ar is a phenyl radical substituted by at least 1 chlorine atom, Alk is a lower alkylene radical, and R' and R" are lower alkyl radicals each comprising more than 1 carbon atom.

The present application is a continuation-in-part of my copending application, Serial No. 559,518, filed January 17, 1956, now U.S. Patent 2,865,921.

In the foregoing structural formula, the chlorinated phenyl radicals comprehended by Ar include o-, m-, and p-chlorophenyl radicals, as also polychlorophenyl radicals such as 2,4-dichlorophenyl, 2,5-dichlorophenyl, 2,4,-6-trichlorophenyl, etc. The lower alkylene radicals herein represented by Alk are bivalent, saturated, acyclic, straight- or branched-chain hydrocarbon radicals of empirical formula $$C_nH_{2n}$$

wherein $n$ is a positive integer greater than 1, and which are exemplified by:

1,2-ethylene (—CH$_2$CH$_2$—)

Trimethylene (—CH$_2$CH$_2$CH$_2$—)

1,2-propylene (—CH$_2$CHCH$_3$)

Tetramethylene (—CH$_2$CH$_2$CH$_2$CH$_2$—)

2-methyl-1,2-propylene (—CH$_2$CCH$_3$)
  |
  CH$_3$ 2,4-pentylene (CH$_3$CHCH$_2$CHCH$_3$)

CH$_3$
              |
2,2-dimethyl-1,3-propylene (—CH$_2$CCH$_2$—)
              |
             CH$_3$ 3-methyl-1,4-butylene (—CH$_2$CH$_2$CHCH$_2$—)
                                |
                               CH$_3$ Hexamethylene (—CH$_2$CH$_2$CH$_2$CH$_2$CH$_2$CH$_2$—)

and like radicals. As to the lower alkyl radicals designated by R' and R" above, these are such as ethyl, propyl, isopropyl, butyl, isobutyl, secondary butyl, tertiary butyl, pentyl, secondary normal pentyl, primary isopentyl, secondary isopentyl, tertiary pentyl, and assorted hexyl groups.

Equivalent to the basic amino esters of this invention for the purposes here described are non-toxic acid addition and quaternary ammonium salts thereof, the composition of which may be symbolized by

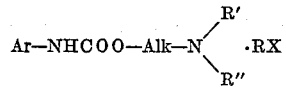

wherein Ar, Alk, R' and R" have the meanings hereinbefore assigned; R is hydrogen or a lower alkyl radical; and X is 1 equivalent of an anion—for example, chloride bromide, iodide, methyl sulfate, ethyl sulfate, benzenesulfonate, toluenesulfonate, tartrate, succinate, malate, acetate, citrate, nitrate, sulfate, phosphate, sulfamate, or the like—which, in combination with the cationic portion of a salt aforesaid, is neither pharmacologically nor otherwise undesirable in pharmaceutical dosage.

The compounds to which this invention relates are useful because of their distinctive pharmacological properties. Thus, for example, they are hypotensive agents; and one of the products in particular, 5-diethylaminopentyl 2,5-dichlorocarbanilate, is an especially potent fungicide, being characterized by a substantial capacity to inhibit the growth of Trichophyton mentagrophytes.

Against the foregoing background of marked and various medicinal characteristics, it is of interest to note that the compounds of this application do not, as a group, display the musculotropic activity known to inhere in compounds superficially related. Moreover, though there is occasional ganglion-blocking potency in evidence, this property likewise is by no means attributive of the class disclosed, despite the incidence of structural modifications ofttimes associated with such action.

The compounds of the present discovery may be manufactured as follows: An appropriate chlorophenyl isocyanate, Ar—NCO, is contacted with a suitable amino alcohol,

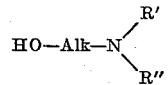

to produce a claimed tertiary base,

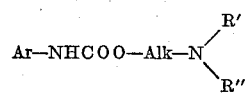

the terms Ar, Alk, R', and R" being defined as before. Contact is maintained at temperatures ranging from 15° to 125° centigrade for periods of time ranging from a few minutes to as long as several hours, lower temperatures generally being preferable as reaction time is increased, and vice versa. One efficacious combination of temperature and time is 6 hours at 35° centigrade. The subject process may be carried out in solvent medium if desired, and while such is not essential, it appears to inhibit the formation of extraneous by-products in some instances. Satisfactory solvents include ether, chloroform, carbon tetrachloride, n=heptane, and like inert, non-polar, organic liquids.

Conversion of the amine bases of this invention to the corresponding acid addition salts is accomplished by simple admixture of these compounds with 1 equivalent of any of various inorganic and strong organic acids, the anionic portion of which conforms to X as hereinabove defined. Alternatively, the bases in question may be quaternized by contact with an alkyl ester of the formula

R—X

R and X having the meanings hereinbefore assigned. Quaternization takes place in the temperature range between 25° and 100° centigrade, using an inert solvent such as chloroform, acetone, butanone, methanol, butanol, or the like as reaction medium. Quaternization is ordinarily completed in from 6 to 60 hours and is generally carried out in a closed system if a lower alkyl halide—such as methyl chloride—is one of the reagents. Using methyl bromide, the manufacture of quaternary salt may be smoothly effected in butanone solution at 70° centigrade, the reaction time being approximately 12 hours.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

2-diethylaminoethyl o-chlorocarbanilate hydrochloride.—A mixture of 23 parts of 2-diethylaminoethanol and 31 parts of o-chlorophenyl isocyanate in 355 parts of anhydrous ether is heated at the boiling point for 6 hours, 8 parts of absolute ethanol being introduced just before the end of the heating period to destroy excess isocyanate. The reaction mixture is divided into equal fractions, I and II.

Addition of slightly more than the theoretical quantity of ethanolic hydrogen chloride to Fraction I causes precipitation of the desired acid addition salt in voluminous shiny flakes. Purification is achieved by recrystallization from a mixture of absolute ethanol and anhydrous ether. The iridescent 2-diethylaminoethyl o-chlorocarbanilate hydrochloride thus obtained melts at approximately 150.5–152° C. The product has the formula

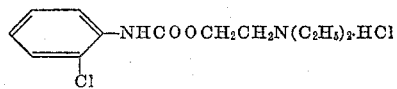

*Example 2*

2-diethylaminoethyl o-chlorocarbanilate methiodide.—2-diethylaminoethylamino o-chlorocarbanilate prepared as described in Example 1 (fraction II) is quaternized as follows: Solvent is evaporated at 90° C. in a stream of nitrogen, and the residue is dissolved in 80 parts of butanone. Approximately 11 parts of methyl bromide is introduced, and the reactants are then heated in a closed vessel at 70° C. for approximately 24 hours. The 2-diethylaminoethyl o-chlorocarbanilate methobromide thus obtained as an oil is converted to the corresponding iodide by decanting off supernatant butanone and treating the residuum with 50 parts of a saturated aqueous solution of sodium iodide. Following thorough agitation, the oil which settles out is crystallized from a mixture of ethanol, acetone, butanone, and ether to give white needles which melt at 132–134° C. This material is 2-diethylaminoethyl o-chlorocarbanilate methiodide.

*Example 3*

2-diethylaminoethyl m-chlorocarbanilate methobromide.—A solution of 23 parts of 2-diethylaminoethanol and 31 parts of m-chlorophenyl isocyanate in 355 parts of anhydrous ether is heated at reflux temperatures for 6 hours. Approximately 10 minutes before the end of the heating period, 8 parts of absolute ethanol is introduced to destroy excess isocyanate. The reaction product is divided into equal fractions, I and II.

Fraction I is stripped of solvent by evaporation at 90° C. in an inert atmosphere, following which it is combined with 80 parts of butanone and 16 parts of methyl bromide. This mixture is heated in a closed vessel at approximately 70° C. for 24 hours. A dense white precipitate is formed which, recovered on a filter and washed thereon with butanone, melts at 144–146° C. The product thus obtained is 2-diethylaminoethyl m-chlorocarbanilate methobromide, having the formula

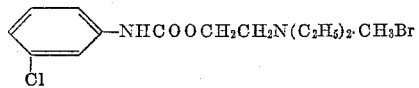

*Example 4*

2-diethylaminoethyl m-chlorocarbanilate hydrochloride.—The other half of the reaction product obtained by the procedure of Example 3 (fraction II) is combined with excess ethanolic hydrogen chloride to precipitate an oil which solidifies on refrigeration. The solid product thus obtained, recrystallized from a mixture of absolute ethanol and anhydrous ether, comes out as beautifully iridescent white flakes melting at 138–140° C. This material is 2-diethylaminoethyl m-chlorocarbanilate hydrochloride.

*Example 5*

2-diethylaminoethyl p-chlorocarbanilate hydrochloride.—A mixture of 23 parts of 2-diethylaminoethanol, 31 parts of p-chlorophenyl isocyanate, and 355 parts of anhydrous ether is heated 4 hours at the boiling point. There is a noticeable exothermic effect, and a crystalline precipitate forms soon after heating is commenced. At the close of the heating period, 8 parts of absolute ethanol is introduced to destroy excess isocyanate, following which the reaction mixture is filtered to remove insoluble matter. The filtrate is divided into equal fractions, I and II.

Friction I is treated with excess ethanolic hydrogen chloride to precipitate white, crystalline 2-diethylaminoethyl p-chlorocarbanilate hydrochloride which, recrystallized from a mixture of absolute ethanol and anhydrous ether, comes down as fluffy felt-like needles melting at approximately 172–173° C. The product has the formula

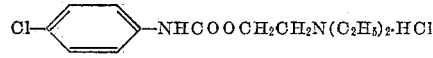

*Example 6*

2-diethylaminoethyl p-chlorocarbanilate methobromide.—Fraction II obtained in the procedure of the foregoing Example 5 is freed of solvent by evaporation at approximately 90° C. in an inert atmosphere. The residue is taken up in approximately 80 parts of butanone and mixed with 14 parts of methyl bromide, following which the reactants are allowed to remain in a sealed kettle at 70° C. overnight. A dense white solid is laid down which, recrystallized from isopropyl alcohol, melts at approximately 157.5–159° C. The quaternary salt thus obtained is 2-diethylaminoethyl p-chlorocarbanilate methobromide.

*Example 7*

3-diethylaminopropyl o-chlorocarbanilate hydrochloride.—A mixture of 26 parts of 3-diethylaminopropanol, 32 parts of o-chlorophenyl isocyanate, and 355 parts of anhydrous ether is refluxed for 6 hours, there being introduced 10 minutes before the end of the reflux period approximately 8 parts of absolute ethanol. The reaction mixture is filtered and the filtrate divided into equal fractions, I and II.

Fraction I is treated with an excess of hydrogen chloride, to precipitate 3-diethylaminopropyl o-chlorocarbanilate hydrochloride, which is separated and recrystallized from a mixture of anhydrous ether and absolute alcohol as an ivory powder melting at approximately 153–154° C. The product has the formula

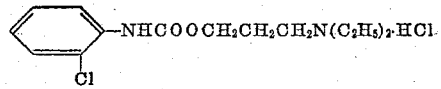

*Example 8*

3-diethylaminopropyl o-chlorocarbanilate methobromide.—Fraction II from the procedure of Example 7 is subjected to evaporation to remove solvent. The residual oil is mixed with 80 parts of butanone and 16 parts of methyl bromide, and this mixture is heated in a closed system for approximately 24 hours at 70° C. An oil layers out which solidifies on standing. This solid product is filtered off and then taken up in chloroform. Upon addition of butanone and subsequent cooling, there is precipitated pure white 3-diethylaminopropyl o-chlorocarbanilate methobromide, which melts at 97–99° C. The product is moderately hygroscopic.

*Example 9*

*3-diethylaminopropyl p-chlorocarbanilate hydrochloride.*—A mixture of 26 parts of 3-diethylaminopropanol, 32 parts of p-chlorophenyl isocyanate, and 550 parts of anhydrous ether is heated at the boiling point for 6 hours. Approximately 8 parts of absolute ethanol is added at the close of the heating period to destroy excess isocyanate. The reaction mixture is then divided into equal fractions, I and II.

Fraction I is precipitated by addition of excess hydrogen chloride, the salt thrown down being purified by recrystallization from a mixture of absolute ethanol and anhydrous ether. The 3-diethylaminopropyl p-chlorocarbanilate hydrochloride so produced melts at 174–176° C. It has the formula

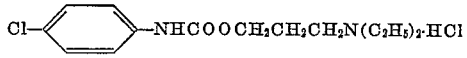

*Example 10*

*3-diethylaminopropyl p-chlorocarbanilate methobromide.*—Fraction II as obtained in accordance with the procedure of Example 9 is stripped of solvent by evaporation at 90° C. in an inert atmosphere. The residue is taken up in approximately 80 parts of butanone and the resultant solution is then saturated with 15 parts of methyl bromide. The solution is transferred to a sealed vessel and heated therein at 70° C. for approximately 24 hours. A solid precipitate forms. The granular white crystals are filtered from the reaction mixture and washed on the filter with butanone. This material is 3-diethylaminopropyl p-chlorocarbanilate methobromide, melting at 178–180.5° C. Further purification may be achieved by recrystallization from isopropyl alcohol.

*Example 11*

*2-diethylaminoethyl 2,5-dichlorocarbanilate hydrochloride.*—A solution of 20 parts of 2-diethylaminoethanol and 34 parts of 2,5-dichlorophenyl isocyanate in 355 parts of anhydrous ether is maintained at approximately 35° C. for 5½ hours. At this point, 4 parts of absolute ethanol is introduced, whereupon heating is continued for an additional 10 minutes. The reaction mixture is then filtered to remove a small amount of insoluble matter formed in process, and the filtrate is divided into two equal fractions, I and II.

Fraction I is combined with an excess of hydrogen chloride dissolved in isopropyl alcohol, thereby precipitating the desired addition salt as a white solid which, purified by recrystallization from a mixture of absolute ethanol and anhydrous ether, melts at approximately 148–149° C. The fluffy needles of 2-diethylaminoethyl 2,5-dichlorocarbanilate hydrochloride so obtained may be represented by the formula

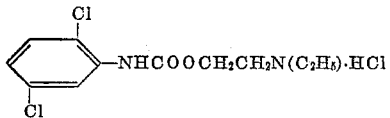

*Example 12*

*2-diethylaminoethyl 2,5-dichlorocarbanilate methobromide.*—From Fraction II obtained by the procedure of Example 11, upon heating with 14 parts of methyl bromide and 80 parts of butanone in a closed system at 70° C., is derived a white crystalline product which, recovered on a filter and washed thereon with acetone, melts at 170–172° C. (with decomposition). This product is 2-diethylaminoethyl 2,5-dichlorocarbanilate methobromide.

*Example 13*

*5-diethylaminopentyl 2,5-dichlorocarbanilate hydrobromide.*—A solution of 27 parts of 5-diethylaminopentanol and 34 parts of 2,5-dichlorophenyl isocyanate in 355 parts of anhydrous ether is heated to reflux temperatures and maintained thereat for 5½ hours. During the last 10 minutes of the heating period, there is present approximately 4 parts of absolute ethanol, introduced to destroy excess isocyanate. The reaction mixture is divided into equal fractions, I and II.

Fraction I is combined with slightly more than the theoretical equivalent of ethanolic hydrogen bromide to produce a solid precipitate which is recrystallized from a mixture of absolute ethanol and anhydrous ether. The resultant product is 5-diethylaminopentyl 2,5-dichlorocarbanilate hydrobromide, which melts at 146–148° C. The product has the formula

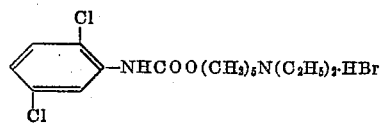

*Example 14*

*5-diethylaminopentyl 2,5-dichlorocarbanilate methobromide.*—Fraction II produced by the procedure of Example 13 is stripped of solvent by evaporation at approximately 90° C. in an inert atmosphere. The residue is taken up in 90 parts of butanone, to which is then added 15 parts of methyl bromide. This mixture is heated in a closed vessel at 70° C. for 6 hours. There is formed, on standing, a white crystalline product which, recovered on a filter and washed thereon with acetone, melts at 103–105° C. This material is 5-diethylaminopentyl 2,5-dichlorocarbanilate methobromide.

*Example 15*

*2-diisopropylaminoethyl m-chlorocarbanilate hydrochloride.*—A solution of 35 parts of 2-diisopropylaminoethanol and 40 parts of m-chlorophenyl isocyanate in approximately 420 parts of anhydrous ether is heated at the boiling point for 2½ hours. Immediately prior to the last 10 minutes of the heating period, there is introduced 8 parts of absolute ethanol to destroy excess isocyanate. The reaction product is cooled and then precipitated by the addition of one equivalent of hydrogen chloride dissolved in isopropyl alcohol. The precipitate is separated and finally recrystallized from a mixture of absolute ethanol and anhydrous ether to give white fluffy needles melting at 161–163° C. The product thus obtained is 2-diisopropylaminoethyl m-chlorocarbanilate hydrochloride, having the formula

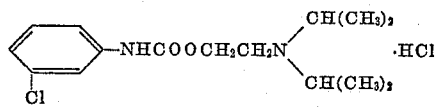

*Example 16*

*3-di-n-propylaminopropyl m-chlorocarbanilate hydrochloride.*—A mixture of 24 parts of 3-di-n-propylaminopropanol, 27 parts of m-chlorophenyl isocyanate, and 355 parts of anhydrous ether is refluxed for 2½ hours. Approximately 8 parts of absolute ethanol is introduced immediately prior to termination of the heating period to destroy excess isocyanate. The cooled reaction mixture is combined with slightly more than the equivalent quantity of hydrogen chloride dissolved in isopropyl alcohol. There is thus precipitated the desired acid addition salt which, recrystallized from a mixture of anhydrous ether and absolute ethanol, comes down as white fluffy needles melting at 155–157° C. The product has the formula

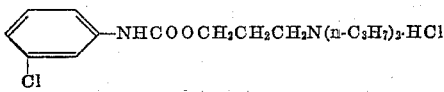

Example 17

*2-di-n-butylaminoethyl p-chlorocarbanilate.*—A mixture of 35 parts of 2-di-n-butylaminoethanol, 31 parts of p-chlorophenyl isocyanate, and 355 parts of anhydrous ether is heated at reflux temperatures for approximately 4 hours. A few minutes before the end of the heating period, 7 parts of absolute ethanol is introduced to destroy excess isocyanate. A small amount of insoluble matter is filtered from the reaction mixture following which the filtrate is treated with 1 equivalent of ethanolic hydrogen chloride. An oil is thrown down. The mixture of oil and ether is extracted with water—in which the oil is soluble—and the aqueous extract then washed with benzene. Oil is again precipitated which, along with the aqueous phase, is separated from supernatant benzene. The oil-and-water mixture is made basic with caustic soda, following which it is extracted with ether. The ether extract is twice washed with water and then dried over anhydrous potassium carbonate. Evaporation of solvent by heating at 90° C. for 3 hours in vacuo leaves as a residue 2-di-n-butylaminoethyl p-chlorocarbanilate. The product has the formula

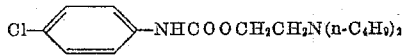

Example 18

*2-di-n-butylaminoethyl p-chlorocarbanilate methochloride.*—A solution of 26 parts of 2-di-n-butylaminoethyl p-chlorocarbanilate in 120 parts of butanone is saturated with 30 parts of methyl chloride and then allowed to stand in a sealed kettle at room temperatures for approximately 72 hours. The solution is next heated at 80° C. for 24 hours, at which point solvent is stripped by evaporation and the residue taken up in approximately 80 parts of absolute ethanol. The ethanol solution is clarified by filtration and then precipitated with approximately 600 parts of warm anhydrous ether. The finely divided white precipitate which comes down is 2-di-n-butylaminoethyl p-chlorocarbanilate methochloride, which melts at 120–122° C.

What is claimed is:
1. A compound of the formula

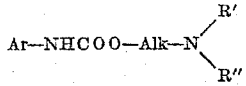

wherein Ar is a chlorinated phenyl radical containing fewer than 3 chlorine atoms, Alk is a lower alkylene radical containing more than 1 carbon atom, and R' and R" are lower alkyl radicals each comprising more than 1 carbon atom.

2. A compound of the formula

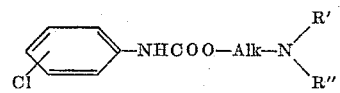

wherein Alk is a lower alkylene radical containing more than 1 carbon atom, and R' and R" are lower alkyl radicals each comprising more than 1 carbon atom.

3. A compound of the formula

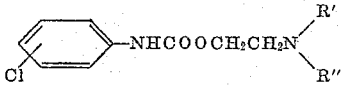

wherein R' and R" are lower alkyl radicals each comprising more than 1 carbon atom.

4. A compound of the formula

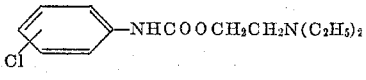

5. 2-diethylaminoethyl o-chlorocarbanilate.
6. 2-diethylaminoethyl m-chlorocarbanilate.
7. 2-diethylaminoethyl p-chlorocarbanilate.
8. A compound of the formula

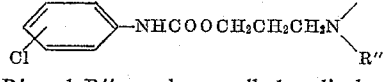

wherein R' and R" are lower alkyl radicals each comprising more than 1 carbon atom.

9. 3-diethylaminopropyl o-chlorocarbanilate.
10. 3-diethylaminopropyl p-chlorocarbanilate.
11. A compound of the formula

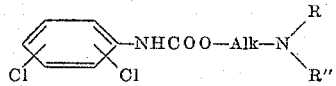

wherein Alk is a lower alkylene radical containing more than 1 carbon atom, and R' and R" are lower alkyl radicals each comprising more than 1 carbon atom.

12. 2-diethylaminoethyl 2,5-dichlorocarbanilate.

References Cited in the file of this patent

UNITED STATES PATENTS

| | | |
|---|---|---|
| 2,033,740 | Rider | Mar. 10, 1936 |
| 2,409,001 | Shelton et al. | Oct. 8, 1946 |
| 2,772,289 | Cusic | Nov. 27, 1956 |